United States Patent
Yamazaki et al.

(10) Patent No.: US 10,422,719 B2
(45) Date of Patent: Sep. 24, 2019

(54) CHROMATIC DISPERSION ESTIMATING CIRCUIT, OPTICAL RECEPTION DEVICE AND CHROMATIC DISPERSION AMOUNT ESTIMATING METHOD

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Etsushi Yamazaki, Kanagawa (JP); Tomohiro Takamuku, Kanagawa (JP); Yuki Yoshida, Kanagawa (JP); Mitsuteru Yoshida, Kanagawa (JP); Koki Shibahara, Kanagawa (JP); Kengo Horikoshi, Kanagawa (JP); Yoshiaki Kisaka, Kanagawa (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/555,321

(22) PCT Filed: Oct. 4, 2016

(86) PCT No.: PCT/JP2016/079538
§ 371 (c)(1),
(2) Date: Sep. 1, 2017

(87) PCT Pub. No.: WO2017/077802
PCT Pub. Date: May 11, 2017

(65) Prior Publication Data
US 2018/0252614 A1 Sep. 6, 2018

(30) Foreign Application Priority Data
Nov. 5, 2015 (JP) .................. 2015-217752

(51) Int. Cl.
*G01M 11/02* (2006.01)
*H04B 3/06* (2006.01)
(Continued)

(52) U.S. Cl.
CPC .......... *G01M 11/02* (2013.01); *G01M 11/338* (2013.01); *H04B 3/06* (2013.01);
(Continued)

(58) Field of Classification Search
CPC ....................................................... H04B 3/06
See application file for complete search history.

(56) References Cited

U.S. PATENT DOCUMENTS 6,909,742 B1 * 6/2005 Leonosky .......... H04B 10/2543
375/232
2002/0191257 A1 * 12/2002 Bessios .............. H04B 10/2572
398/158
(Continued)

FOREIGN PATENT DOCUMENTS

WO WO 2012/105628 A1 8/2012

OTHER PUBLICATIONS

Galtarossa, A., et al., "Polarization Mode Dispersion," Springer Science + Business Media Inc., Jul. 1, 2005.
(Continued)

*Primary Examiner* — Omar S Ismail
(74) *Attorney, Agent, or Firm* — Arent Fox LLP (57) ABSTRACT

A Fourier-transformer performs Fourier transform on a filter coefficient output from an adaptive equalizer which comprises a finite impulse response filter of N taps (N represents an integer of 2 or more) in a time direction. An eigenvalue
(Continued)

sum calculator integrates a frequency-differentiation result of the Fourier-transformed filter coefficient and a complex conjugate of the Fourier-transformed filter coefficient to calculate a matrix, and calculates a sum of two eigenvalues of the matrix. A proportionality factor calculator calculates a proportionality factor for frequency from the sum of the two eigenvalues.

8 Claims, 4 Drawing Sheets

(51) Int. Cl.
*G01M 11/00* (2006.01)
*H04B 10/079* (2013.01)
*H04B 10/2513* (2013.01)
*H04B 10/61* (2013.01)

(52) U.S. Cl.
CPC . *H04B 10/07951* (2013.01); *H04B 10/25133* (2013.01); *H04B 10/6161* (2013.01); *H04B 10/6162* (2013.01)

(56) References Cited

U.S. PATENT DOCUMENTS

| | | | | |
|---|---|---|---|---|
| 2010/0119241 | A1* | 5/2010 | Yang | H04B 10/60 398/208 |
| 2010/0284701 | A1* | 11/2010 | Lin | H04B 10/2513 398/160 |
| 2012/0038506 | A1* | 2/2012 | Kanamoto | G01S 3/74 342/158 |
| 2012/0123749 | A1* | 5/2012 | Watanabe | H04B 10/25133 703/2 |
| 2013/0343749 | A1 | 12/2013 | Yamazaki et al. | |
| 2015/0256267 | A1* | 9/2015 | Randel | H04B 10/6161 398/208 |

OTHER PUBLICATIONS

Gordon, J.P., et al., "PMD fundamentals: Polarization mode dispersion in optical fibers," PNAS, vol. 97, No. 9, pp. 4541-4550, Apr. 25, 2000.
Kikuchi, K., "Polarization-demultiplexing algorithm in the digital coherent receiver," IEEE/LEOS Summer Topical Meetings, paper MC2.2, Jul. 2008.
Miyamoto, Y., et al., "Ultrahigh-capacity Digital Coherent Optical Transmission Technology," NTT Technical Review, vol. 23, No. 3, pp. 13-18, Mar. 2011. (in Japanese).
Miyamoto, Y., et al., "Ultrahigh-capacity Digital Coherent Optical Transmission Technology," NTT Technical Review, vol. 9, No. 8, pp. 1-7, Aug. 2011.
English translation of the International Preliminary Report on Patentability of related International Application No. PCT/JP2016/079538 dated May 17, 2018.
Extended European Search Report of European Patent Application No. 16861870.0 dated Oct. 2, 2018.
Canadian Office Action of Canadian Patent Application No. 2,977,620 dated Jun. 20, 2018.
Canadian Office Action of Canadian Patent Application No. 2,977,620 dated Feb. 22, 2019.

* cited by examiner

CHROMATIC DISPERSION ESTIMATING CIRCUIT, OPTICAL RECEPTION DEVICE AND CHROMATIC DISPERSION AMOUNT ESTIMATING METHOD

CROSS-REFERENCE TO RELATED APPLICATIONS

This application is a National Stage entry of International Application No. PCT/JP2016/079538, filed Oct. 4, 2016, which claims priority to Japanese Patent Application No. 2015-217752, filed Nov. 5, 2015. The disclosures of the priority applications are incorporated in their entirety herein by reference.

FIELD

The present invention relates to a chromatic dispersion estimating circuit, an optical reception device and a chromatic dispersion amount estimating method that can accurately determine residual dispersion which could not be compensated by a chromatic dispersion compensator at a front stage.

BACKGROUND

In the field of optical communication, attention has been paid to a transmission system based on the combination of a coherent detection system and digital signal processing. Such a transmission system is also called a digital coherent system, and can dramatically enhance the frequency utilization efficiency (see NPL 1, for example).

Figure 1:
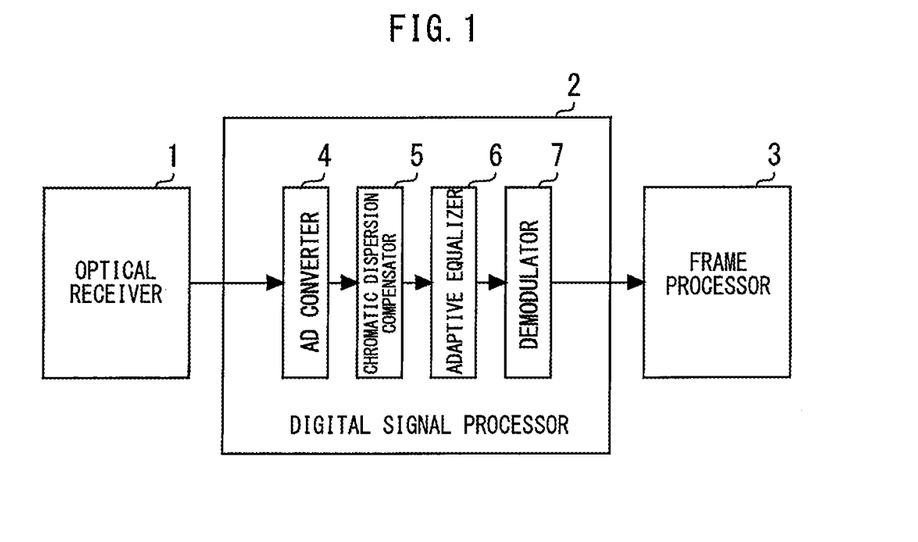
FIG. 1 is a diagram showing an optical reception device used for the digital coherent system.

FIG. 1 is a diagram showing an optical reception device used for the digital coherent system. An optical receiver 1 converts an optical signal transmitted through an optical fiber to an electrical signal by coherent detection. A digital signal processor 2 demodulates the thus-converted electrical signal by digital signal processing. A frame processor 3 separates and processes a client signal stored in a transmission frame of the demodulated signal.

In the digital signal processor 2, an analog-to-digital (AD) converter 4 first converts an electrical signal output from the optical receiver 1 to a digital signal. Subsequently, a chromatic dispersion compensator 5 performs digital signal processing on the digital signal to estimate a chromatic dispersion amount added to the optical signal through the optical fiber as a transmission path and applies chromatic dispersion for compensating the estimated chromatic dispersion amount, thereby suppressing waveform distortion caused by the chromatic dispersion. Subsequently, an adaptive equalizer 6 adaptively compensates an output signal of the chromatic dispersion compensator 5 for waveform deterioration occurring mainly due to high-speed polarization fluctuation of the optical signal transmitted through the optical fiber. Subsequently, a demodulator 7 estimates a carrier phase from a signal waveform-equalized by the adaptive equalizer 6 and performs regeneration.

For example, a technique for extracting a clock from a demodulated signal and setting a compensated dispersion value so that the extraction sensitivity of the clock is maximum has been disclosed as a chromatic dispersion amount estimating method used in the chromatic dispersion compensator 5 (see PTL 1, for example).

The adaptive equalizer 6 comprises a finite impulse response (Finite Impulse Response, FIR) filter of N taps (N represents an integer of 2 or more) in a time direction. The high-speed waveform distortion is compensated by adaptively updating the filter coefficients of the adaptive equalizer 6 at a sufficiently higher speed than that of the polarization fluctuation of the optical signal in the optical fiber.

CITATION LIST

Patent Literature

[PTL 1]: International Publication No. WO2012/105628

Non Patent Literature

[NPL 1]: Yutaka Miyamoto, Akihide Sano, Eiji Yoshida, and Toshikazu Sakano, "Super Large Capacity Digital Coherent Optical Transmission Technique", NTT Technical Journal, Vol. 23, No. 3, P. 13-18 (March, 2011).

[NPL 2]: K Kikuchi, "Polarization-demultiplexing algorithm in the digital coherent receiver," IEEE/LEOS Summer Topical Meetings, paper MC2.2, 2008

[NPL 3]: Andrea Galtarossa, and Curtis R. Menyuk, "Polarization Mode Dispersion," Springer Science+Business Media Inc.

SUMMARY

Technical Problem

Here, the difference between the chromatic dispersion amount estimated in the chromatic dispersion compensator 5 and the chromatic dispersion amount of the optical fiber to be actually compensated will be referred to as "residual dispersion". When there is such a residual dispersion, it is impossible to perfectly remove the waveform distortion caused by the chromatic dispersion in the chromatic dispersion compensator 5. Therefore, a signal in which the waveform distortion caused by the chromatic dispersion remains is output to the adaptive equalizer 6.

The adaptive equalizer 6 can also compensate the waveform distortion caused by the residual dispersion. However, in order to compensate the waveform distortion caused by the residual dispersion, the adaptive equalizer 6 must use a part of the processing capability to be used for compensating the waveform distortion caused by polarization mode dispersion. Accordingly, there has been a problem that when the residual dispersion is not sufficiently removed in the chromatic dispersion compensator 5, the capability of compensating the waveform distortion caused by the polarization mode dispersion or the like deteriorates in the adaptive equalizer 6.

The present invention has been implemented to solve the problem as described above, and has an object to provide a chromatic dispersion estimating circuit, an optical reception device and a chromatic dispersion amount estimating method that can accurately determine residual dispersion which could not be compensated by a chromatic dispersion compensator at a front stage.

Solution to Problem

A chromatic dispersion estimating circuit according to the present invention includes: a Fourier-transformer performing Fourier transform on a filter coefficient output from an adaptive equalizer which comprises a finite impulse response filter of N taps (N represents an integer of 2 or more) in a time direction; an eigenvalue sum calculator integrating a frequency-differentiation result of the Fourier-transformed filter coefficient and a complex conjugate of the Fourier-transformed filter coefficient to calculate a matrix, and calculating a sum of two eigenvalues of the matrix; and a proportionality factor calculator calculating a proportionality factor for frequency from the sum of the two eigenvalues.

Advantageous Effects of Invention

The present invention makes it possible to accurately determine residual dispersion which could not be compensated by a chromatic dispersion compensator at a front stage.

DESCRIPTION OF EMBODIMENTS

The present invention relates to a chromatic dispersion amount estimating method and a chromatic dispersion estimating circuit that estimate, from filter coefficients of an adaptive equalizer, residual dispersion which could not be compensated by a chromatic dispersion compensator at a front stage. Furthermore, the present invention relates to an optical reception device for compensating chromatic dispersion added to a reception signal based on an estimated residual dispersion value.

Figure 2:
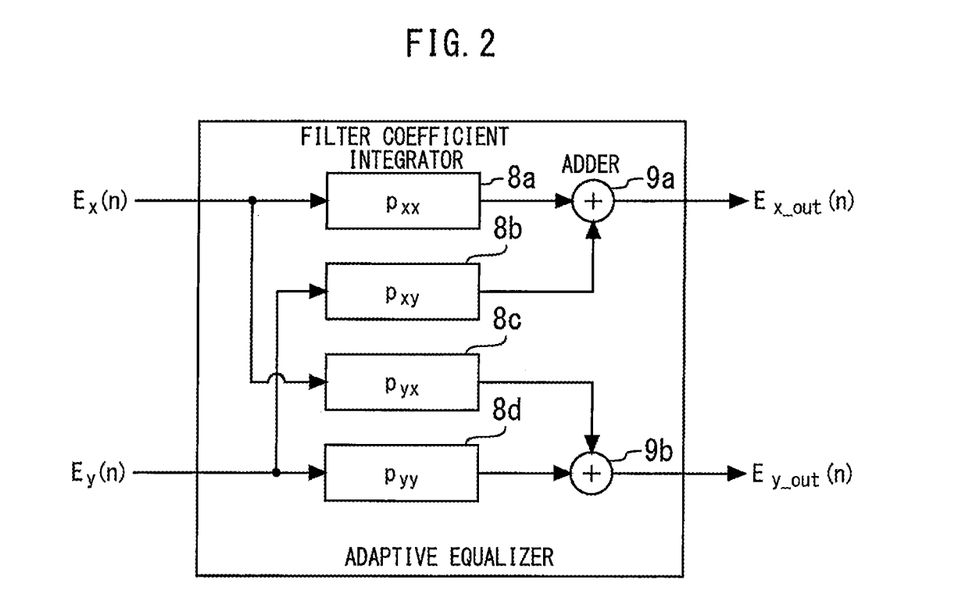
FIG. 2 is a diagram showing the principle of the present invention.

FIG. 2 is a diagram showing the principle of the present invention. FIG. 2 shows the configuration of an adaptive equalizer disclosed in NPL 2. The adaptive equalizer includes four filter coefficient integrators 8a, 8b, 8c and 8d, and two adders 9a and 9b. The adaptive equalizer is input with electric field components $E_x(n)$ and $E_y(n)$ of two polarized waves of optical signal transmitted through an optical fiber. Here, n in the electrical field components represents a sampling time position.

The filter coefficient integrators 8a and 8c output integration results of filter coefficients $p_{xx}$, $p_{yx}$ for an input signal $E_x(n)$, respectively. The filter coefficient integrators 8b and 8d output integration results of filter coefficients $p_{xy}$, $p_{yy}$ for an input signal $E_y(n)$, respectively. The adder 9a outputs an addition result of the output signals of the filter coefficient integrators 8a and 8b as $E_{x\_out}(n)$. The adder 9b outputs an addition result of the output signals of the filter coefficient integrators 8c and 8d as $E_{y\_out}(n)$. Accordingly, the adaptive equalizer performs calculation processing represented by the following mathematical expression 1.

$$\begin{pmatrix} E_{x\_out}(n) \\ E_{y\_out}(n) \end{pmatrix} = \begin{pmatrix} p_{xx} & p_{xy} \\ p_{yx} & p_{yy} \end{pmatrix} \begin{pmatrix} E_x(n) \\ E_y(n) \end{pmatrix} = \hat{h} \begin{pmatrix} E_x(n) \\ E_y(n) \end{pmatrix} \quad \text{[Math. 1]}$$

Here, $\hat{h}(i)$ represents the Jones matrix of the adaptive equalizer. When the tap length of the adaptive equalizer is represented by N, the mathematical expression 1 can be developed as represented by the mathematical expression 2.

$$E_{x\_out}(n) = \sum_{i=1}^{N} \{p_{xx}(i) * E_x(n+i) + p_{xy}(i) * E_y(n+i)\} \quad \text{[Math. 2]}$$

$$E_{y\_out}(n) = \sum_{i=1}^{N} \{p_{yx}(i) * E_x(n+i) + p_{yy}(i) * E_y(n+i)\}$$

$E_{x\_out}(n)$ and $E_{y\_out}(n)$ output from the adaptive equalizer represent the electrical field components of two polarized waves in optical signal (that is, optical signal at transmission) from which polarization fluctuation occurring in the optical fiber as a transmission path is removed.

NPL 3 describes a method of calculating polarization mode dispersion (Polarization Mode Dispersion, PMD) by using the Jones matrix $\hat{h}(i)$ of the mathematical expression 1. When a Fourier Transform result of the Jones matrix $\hat{h}(i)$ is represented by $$U(\omega) = \begin{pmatrix} u_{11}(\omega) & u_{12}(\omega) \\ u_{21}(\omega) & u_{22}(\omega) \end{pmatrix},$$

the difference $\tau_1(\omega) - \tau_2(\omega)$ between two eigenvalues $\tau_1(\omega)$ and $\tau_2(\omega)$ of the matrix $$j \frac{\partial U(\omega)}{\partial \omega} U(\omega)^\dagger$$

corresponding to a PMD operator corresponds to a differential group delay (Differential Group Delay, DGD). Secondary PMD is achieved by subjecting DGD to frequency-differentiation. Here, j represents an imaginary unit, and $U(\omega)^\dagger$ represents the complex conjugate transposed matrix of a matrix $U(\omega)$.

The two eigenvalues $\tau_1(\omega)$ and $\tau_2(\omega)$ of the PMD operator are represented by the following mathematical expression 3.

$$\tau_1(\omega) = \tau_0(\omega) + \frac{\delta\tau(\omega)}{2} \quad \text{[Math. 3]}$$

$$\tau_2(\omega) = \tau_0(\omega) - \frac{\delta\tau(\omega)}{2}$$

Here, $\tau_0(\omega)$ represents the average value of the two eigenvalues, and $\delta\tau(\omega)$ represents a PMD-depending term (a value equivalent to PMD).

As is apparent from the mathematical expression 3, the PMD-depending term can be offset by adding the two eigenvalues of the PMD operator. Accordingly, calculation of the following mathematical expression 4 provides a group delay $2\tau_0(\omega)$ excluding the effect of PMD.

$$\tau_1(\omega) + \Sigma_2(\omega) \quad \text{[Math. 4]}$$

This is dependent on a value S proportional to residual dispersion which could not be removed in the chromatic dispersion compensator at the front stage of the adaptive equalizer.

The waveform distortion caused by the chromatic dispersion is represented as phase rotation of a carrier wave which is proportional to the square of the frequency in a frequency domain. Specifically, it is represented by the following mathematical expression 5.

[Math. 5]

$$\exp\left(j\frac{S}{2}\omega^2\right)$$

Here, it is apparent that S*ω is determined by differentiating the mathematical expression 5 with the frequency and further calculating a complex conjugate product and an imaginary unit product. This means that $2\tau_0(\omega)$ as the calculation result of the mathematical expression 4 contains the term of S*ω.

As described above, the inventors have paid attention to the fact that the "difference" between the two eigenvalues of the PMD operator is proportional to PMD, and have achieved a knowledge that the "sum" of the two eigenvalues can conversely cancel the PMD-depending term and thus estimate the residual dispersion.

In summary, (a) Fourier transform is performed on the filter coefficient matrix ĥ(i) of the adaptive equalizer, (b) the Fourier-transformed filter coefficient matrix U(ω) is differentiated with the frequency, and further two eigenvalues $\tau_1(\omega)$ and $\tau_2(\omega)$ are determined from the matrix corresponding to the PMD operator acquired by calculating the complex conjugate product and the imaginary unit product of the matrix U(ω), (c) the two eigenvalues are added, and (d) the sum of the two eigenvalues is proportional to the frequency m, and thus the residual dispersion is achieved by determining the proportionality factor.

A chromatic dispersion estimating circuit, an optical reception device and a chromatic dispersion amount estimating method according to embodiments of the present invention will be described below with reference to the drawings. The same or corresponding constituent elements are represented by the same reference numerals, and the duplicative descriptions thereof may be omitted.

Embodiment 1

Figure 3:
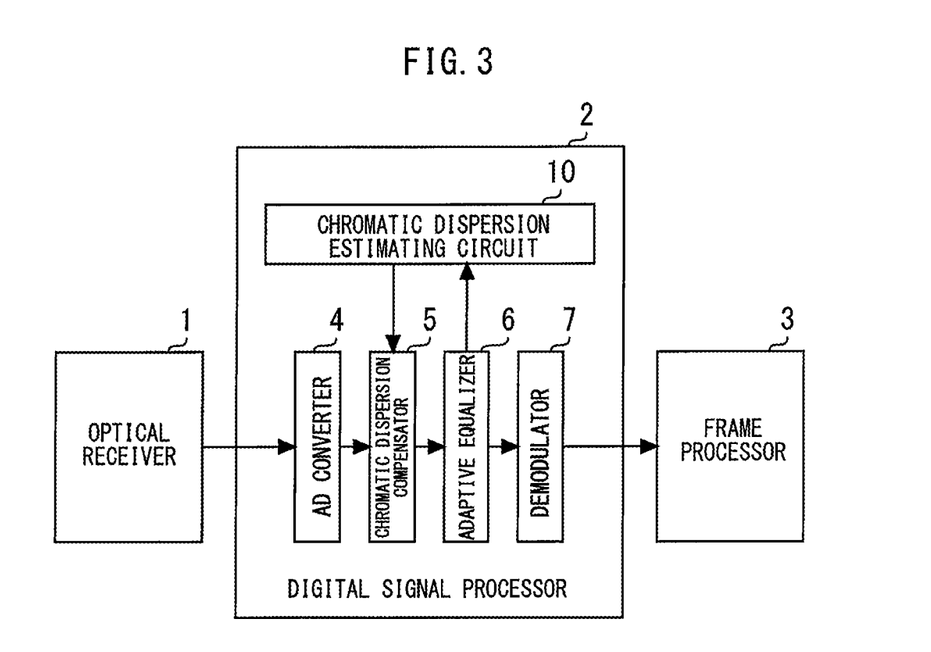
FIG. 3 is a diagram showing the optical reception device according to Embodiment 1 of the present invention.

FIG. 3 is a diagram showing the optical reception device according to Embodiment 1 of the present invention. An optical receiver 1 converts an optical signal transmitted through an optical fiber to an electrical signal by coherent detection. A digital signal processor 2 demodulates the thus-converted electrical signal by digital signal processing. A frame processor 3 separates and processes a client signal stored in a transmission frame of the demodulated signal.

In the digital signal processor 2, an analog-to-digital (AD) converter 4 first converts an electrical signal output from the optical receiver 1 to a digital signal. Subsequently, a chromatic dispersion compensator 5 performs digital signal processing on the digital signal to estimate a chromatic dispersion amount added to the optical signal in the optical fiber as a transmission path, and applies a chromatic dispersion for compensating the chromatic dispersion amount, thereby suppressing waveform distortion caused by the chromatic dispersion. Subsequently, an adaptive equalizer 6 adaptively compensates an output signal of the chromatic dispersion compensator 5 for waveform deterioration occurring mainly due to high-speed polarization fluctuation of the optical signal transmitted through the optical fiber. Finally, a demodulator 7 demodulates an output signal of the adaptive equalizer 6. Specifically, the demodulator 7 estimates a carrier phase from a signal waveform-equalized by the adaptive equalizer 6 and performs regeneration.

The adaptive equalizer 6 comprises a finite impulse response (Finite Impulse Response, FIR) filter of N taps (N represents an integer of 2 or more) in a time direction. Each tap performs calculation processing by using four filter coefficients $p_{xx}(i)$, $p_{xy}(i)$, $p_{yx}(i)$ and $p_{yy}(i)$. Here, i represents an i-th tap out of the N taps. Specifically, the adaptive equalizer 6 performs calculation processing represented by the mathematical expression 6.

[Math. 6]

$$\begin{pmatrix} E_{x\_out}(n) \\ E_{y\_out}(n) \end{pmatrix} = \sum_{i=1}^{N} \begin{pmatrix} p_{xx}(i) & p_{xy}(i) \\ p_{yx}(i) & p_{yy}(i) \end{pmatrix} \begin{pmatrix} E_x(n) \\ E_y(n) \end{pmatrix} = \hat{h} \begin{pmatrix} E_x(n) \\ E_y(n) \end{pmatrix}$$

In this embodiment, as compared with the configuration shown in FIG. 1, a chromatic dispersion estimating circuit 10 is further provided to the digital signal processor 2. Filter coefficients $p_{xx}(i)$, $p_{xy}(i)$, $p_{yx}(i)$ and $p_{yy}(i)$ (i=1, 2, ..., N) for the N taps are input from the adaptive equalizer 6 into the chromatic dispersion compensator 5. In response to this input, the chromatic dispersion estimating circuit 10 calculates, through a predetermined arithmetic operation, residual dispersion which could not be compensated by the chromatic dispersion compensator 5, and outputs the calculated residual dispersion to the chromatic dispersion compensator 5.

Figure 4:
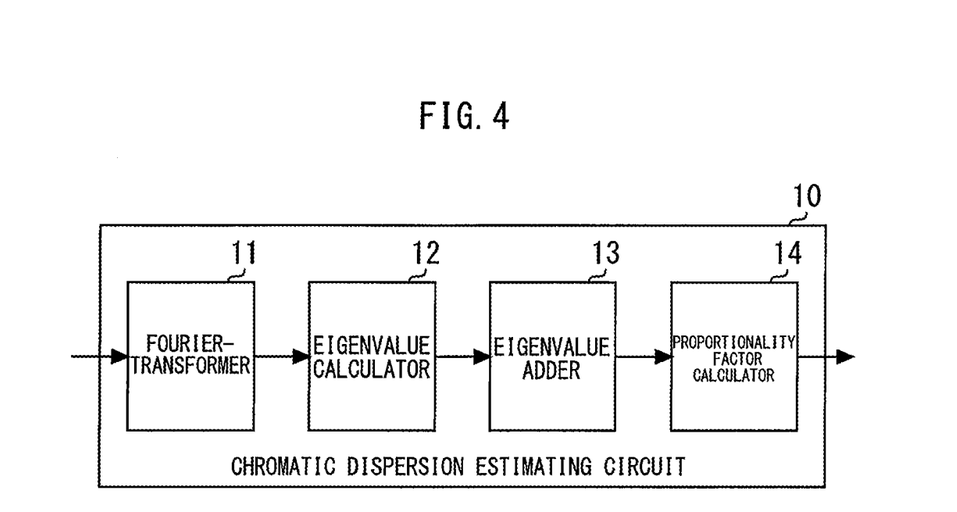
FIG. 4 is a diagram showing the chromatic dispersion estimating circuit according to Embodiment 1 of the present invention.

FIG. 4 is a diagram showing the chromatic dispersion estimating circuit according to Embodiment 1 of the present invention. The chromatic dispersion estimating circuit 10 includes a Fourier-transformer 11, an eigenvalue calculator 12, an eigenvalue adder 13 and a proportionality factor calculator 14.

The Fourier-transformer 11 is input with the filter coefficients $p_{xx}(i)$, $p_{xy}(i)$, $p_{yx}(i)$ and $p_{yy}(i)$ for the N taps which are output from the adaptive equalizer 6. The Fourier-transformer 11 performs Fourier transform on the input filter coefficients with respect to i, and outputs the Fourier-transform result to the eigenvalue calculator 12 (Fourier transform step). The output from the Fourier-transformer 11 contains four elements $u_{11}(\omega)$, $u_{12}(\omega)$, $u_{21}(\omega)$ and $u_{22}(\omega)$ of the above-described matrix U(ω). The matrix U(ω) represents filter coefficients in a frequency domain.

Each element of the matrix U(ω) output from the Fourier-transformer 11 is input to the eigenvalue calculator 12. The eigenvalue calculator 12 partially differentiates the matrix U(ω) with the frequency ω, and multiplies the calculation result by a complex conjugate transposed matrix U(ω)† and further by an imaginary unit j to calculate the matrix $$j\frac{\partial U(\omega)}{\partial \omega}U(\omega)^\dagger$$

corresponding to the PMD operator. Here, since U(ω) is a discrete value, in place of the partial differentiation of the matrix U(ω) with the frequency ω, for example, a difference of $U(\omega_{n+1})-U(\omega_n)$ may be calculated. Subsequently, the eigenvalue calculator 12 determines two eigenvalues $\tau_1(\omega)$ and $\tau_2(\omega)$ from the matrix U(ω) for each frequency. This calculation processing is equivalent to the processing of finding a solution of a general eigenvalue problem, and the eigenvalue is determined by finding a solution of two equations having the elements $u_{11}(\omega)$, $u_{12}(\omega)$, $u_{21}(\omega)$ and $u_{22}(\omega)$ of the matrix $U(\omega)$ as coefficients.

The two eigenvalues $\tau_1(\omega)$ and $\tau_2(\omega)$ output from the eigenvalue calculator 12 are input to the eigenvalue adder 13. The eigenvalue adder 13 adds the two eigenvalues to determine $\tau_1(\omega)+\tau_2(\omega)$, and outputs the addition result to the proportionality factor calculator 14.

As described above, the eigenvalue calculator 12 and the eigenvalue adder 13 integrate the frequency-differentiation result of the Fourier-transformed filter coefficients and the complex conjugate of the Fourier-transformed filter coefficients to calculate a matrix, and calculate the sum of the two eigenvalues of this matrix (eigenvalue sum calculation step).

The sum $\tau_1(\omega)+\tau_2(\omega)$ of the two eigenvalues output from the eigenvalue adder 13 is input to the proportionality factor calculator 14. The proportionality factor calculator 14 calculates the proportionality factor S for the frequency in the real-part of the sum $\tau_1(\omega)+\tau_2(\omega)$ of the two eigenvalues (proportionality factor calculation step). This proportionality factor S is a value proportional to the residual dispersion which could not be removed in the chromatic dispersion compensator 5. The proportionality factor calculator 14 converts the proportionality factor S to a residual dispersion amount, and outputs the residual dispersion amount to the chromatic dispersion compensator 5.

The eigenvalue calculator 12 does not necessarily require the calculation of the imaginary unit product when the matrix corresponding to the PMD operator is determined. When the calculation of the imaginary unit product is not performed in the eigenvalue calculator 12, the imaginary-part of the sum $\tau_1(\omega)+\tau_2(\omega)$ of the two eigenvalues may be determined in the proportionality factor calculator 14, and the proportionality factor in the imaginary-part for the frequency may be calculated.

Through the above-described calculations, the chromatic dispersion estimating circuit 10 estimates the residual dispersion from the filter coefficients output from the adaptive equalizer 6, and outputs the estimated residual dispersion to the chromatic dispersion compensator 5. The chromatic dispersion compensator 5 adds a fixedly preset first chromatic dispersion compensation amount with second chromatic dispersion compensation amount for compensating residual dispersion which cannot be compensated with only the first chromatic dispersion compensation amount, and performs the chromatic dispersion compensation so as to reduce the residual dispersion more greatly.

As described above, the chromatic dispersion estimating circuit 10 according to this embodiment can accurately determine the residual dispersion that could not be compensated by the chromatic dispersion compensator 5 at the front stage. Furthermore, in the optical reception device according to the embodiment, the chromatic dispersion compensator 5 performs the chromatic dispersion compensation with the value of the residual dispersion calculated by the chromatic dispersion estimating circuit 10, whereby the residual dispersion can be more greatly reduced as compared with the prior art. Therefore, the adaptive equalizer 6 can maximally exercise the capability of compensating the waveform distortion caused by the polarization mode dispersion or the like which should be originally performed by the adaptive equalizer 6.

Since the chromatic dispersion estimating circuit 10 estimates the residual dispersion by using the filter coefficients output from the adaptive equalizer 6, the residual dispersion can be estimated without influencing a reception signal even during operation of the optical reception device (that is, even while an optical signal is conducting).

The chromatic dispersion estimating circuit 10 may periodically and repetitively estimate the above residual dispersion. The chromatic dispersion of the optical fiber as a transmission path varies temporally, for example according to variation of temperature or stress, and in connection with this variation, the residual dispersion in the chromatic dispersion compensator 5 also varies temporally. Therefore, the chromatic dispersion estimating circuit 10 periodically repeats the estimation processing of the residual dispersion, whereby the temporally varying residual dispersion can be also estimated. Furthermore, the chromatic dispersion estimating circuit 10 periodically estimates the residual dispersion and outputs the estimated result to the chromatic dispersion compensator 5, and the chromatic dispersion compensator 5 performs the chromatic dispersion compensation according to the value of the residual dispersion, whereby the temporally varying residual dispersion can be compensated while adapting to the variation of the residual dispersion.

Embodiment 2

Figure 5:
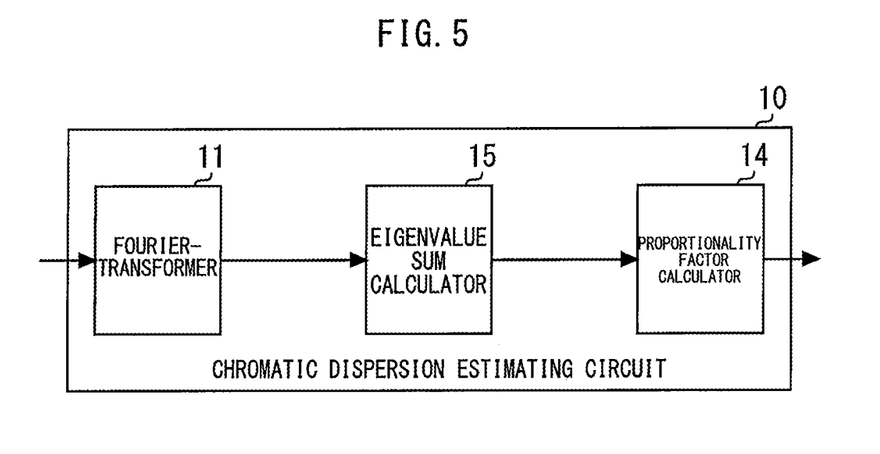
FIG. 5 is a diagram showing a chromatic dispersion estimating circuit according to an embodiment 2 of the present invention.

The matrix $$j\frac{\partial U(\omega)}{\partial \omega}U(\omega)^{\dagger}$$

corresponding to the PMD operator is the Hermitian matrix. In the case of the Hermitian matrix, it is known that a trace as the sum of diagonal components of the matrix is equal to the sum of two eigenvalues. Therefore, in this embodiment, a chromatic dispersion estimating circuit 10 shown in FIG. 5 is used in place of the chromatic dispersion estimating circuit 10 shown in FIG. 4 of Embodiment 1.

FIG. 5 is a diagram showing a chromatic dispersion estimating circuit according to an embodiment 2 of the present invention. In the chromatic dispersion estimating circuit 10 according to this embodiment, the eigenvalue calculator 12 and the eigenvalue adder 13 shown in FIG. 4 of Embodiment 1 are replaced by an eigenvalue sum calculator 15.

Each element of the matrix $U(\omega)$ output from the Fourier-transformer 11 is input to the eigenvalue sum calculator 15. The eigenvalue calculator 12 partially differentiates the matrix $U(\omega)$ with the frequency $\omega$, and multiplies the calculation result by a complex conjugate transposed matrix $U(\omega)^{\dagger}$ to calculate the matrix $$\frac{\partial U(\omega)}{\partial \omega}U(\omega)^{\dagger}$$

corresponding to the PMD operator. Subsequently, the eigenvalue sum calculator 15 calculates a trace as the sum of diagonal components $u_{11}(\omega)$ and $u_{22}(\omega)$ of the matrix $$\frac{\partial U(\omega)}{\partial \omega}U(\omega)^{\dagger}.$$

The eigenvalue calculator 12 outputs the calculation result to the proportionality factor calculator 14.

The chromatic dispersion estimating circuit 10 according to this embodiment can reduce the calculation processing as compared with the chromatic dispersion estimating circuit 10 according to Embodiment 1. Accordingly, the comparable residual-dispersion estimation can be achieved with a smaller circuit scale or less power consumption as compared with Embodiment 1.

Embodiment 3

As can be also estimated from the mathematic expression 6, each of the matrix elements of the Jones matrix $\hat{h}(i)$ of the filter coefficients output from the adaptive equalizer 6 is the arrangement with the same tap length as an FIR filter. Therefore, the Fourier-transformer 11 according to this embodiment inserts zero-value before and after the arrangement of each matrix element of the matrix $\hat{h}(i)$ to extend the arrangement length. The Fourier-transformer 11 performs Fourier transform on the matrix $\hat{h}(i)$ in which the zero value is inserted.

As a result, the Fourier-transformer 11 can enhance the frequency resolution of the matrix $U(\omega)$ after Fourier transform. The enhancement of the frequency resolution of the matrix $U(\omega)$ enhances the precision of the differentiation calculation of the frequency in the eigenvalue calculator 12 of Embodiment 1 or the eigenvalue sum calculator 15 of the embodiment 2. Furthermore, the estimation precision of the proportionality factor S for the frequency in the proportionality factor calculator 14 of the embodiments 1 and 2 can be enhanced. Accordingly, the estimation precision of the residual dispersion can be enhanced.

Embodiment 4

In NPL 3, PMD is determined on the assumption that the Jones matrix $\hat{h}(i)$ of the filter coefficients in the adaptive equalizer 6 is a unitary operator. However, the Jones matrix corresponding to the adaptive equalizer filter is not necessarily a unitary matrix because power is not held at an input and an output. Therefore, when the PMD operator is determined while the Jones matrix corresponding to the adaptive equalizer filter is set as a unitary matrix, the eigenvalue thereof is calculated and the value S proportional to the residual dispersion is calculated, an error occurs in the estimation value of the residual dispersion.

Therefore, the Fourier-transformer 11 of this embodiment performs Fourier transform on the Jones matrix $\hat{h}(i)$ of the filter coefficients output from the adaptive equalizer 6, calculates a determinant $\det(U(\omega))$ of each frequency $\omega$ component for the resultant matrix $U(\omega)$, normalizes the matrix $U(\omega)$ of each frequency with the determinant $\det(U(\omega))$ and outputs the normalized matrix $U(\omega)$. As a result, the error of the value S proportional to the residual dispersion calculated by the chromatic dispersion estimating circuit 10 can be reduced, and the estimation precision of the residual dispersion can be enhanced.

An oversampled input signal such as a 2-oversampled input signal or the like is frequently supposed for the adaptive equalizer 6. In such a case, a high-frequency component has a small value, and the precision deteriorates. Therefore, when the proportionality factor of the sum of the two eigenvalues for the frequency is determined, the proportionality factor calculator 14 may disregard the high-frequency component, and estimate the proportionality factor while limiting to, for example, a baud-rate frequency range or a smaller frequency range than the baud-rate frequency range, whereby the estimation precision of the residual can be further enhanced.

Embodiment 5

In the embodiments 1 to 4, the value of the residual dispersion of the chromatic dispersion estimating circuit 10 is estimated and output to the chromatic dispersion compensator 5, and the chromatic dispersion compensator 5 performs chromatic dispersion compensation so as to reduce the residual dispersion. However, there is a case where the value of the residual dispersion estimated in the chromatic dispersion estimating circuit 10 is different from the value of actual residual dispersion (that is, chromatic dispersion which could not be compensated by the chromatic dispersion compensator 5) according to the configuration of the optical reception device or the like. However, the actual residual dispersion and the value S proportional to the estimated residual dispersion are in linear relationship with each other, and the relationship of (the actual residual dispersion)=A×(the value S proportional to the estimated residual dispersion) is satisfied. Here, A represents a constant determined according to the configuration of the optical reception device or the like.

Therefore, the chromatic dispersion estimating circuit 10 according to this embodiment calculates the value of S/A which is obtained by dividing the value S proportional to the residual dispersion calculated by the arithmetic operation of the embodiments 1 to 4 by the constant A, and outputs the calculated value of S/A to the chromatic dispersion compensator 5. The chromatic dispersion compensator 5 performs the chromatic dispersion compensation so that the value of S/A approaches to zero. Specifically, when an initial chromatic dispersion compensation amount (first chromatic dispersion compensation amount) in the chromatic dispersion compensator 5 is represented by D0, the residual dispersion can be approached to zero by setting the chromatic dispersion compensation amount in the chromatic dispersion compensator 5 to D0+S/A.

Furthermore, even when the chromatic dispersion estimating circuit 10 provides the value of S/A, the chromatic dispersion may further remain in the chromatic dispersion compensator 5, for example due to occurrence of an error in the constant A or the like. Therefore, the chromatic dispersion estimating circuit 10 may repeat the estimation of the value S proportional to the residual dispersion at plural times.

Figure 6:
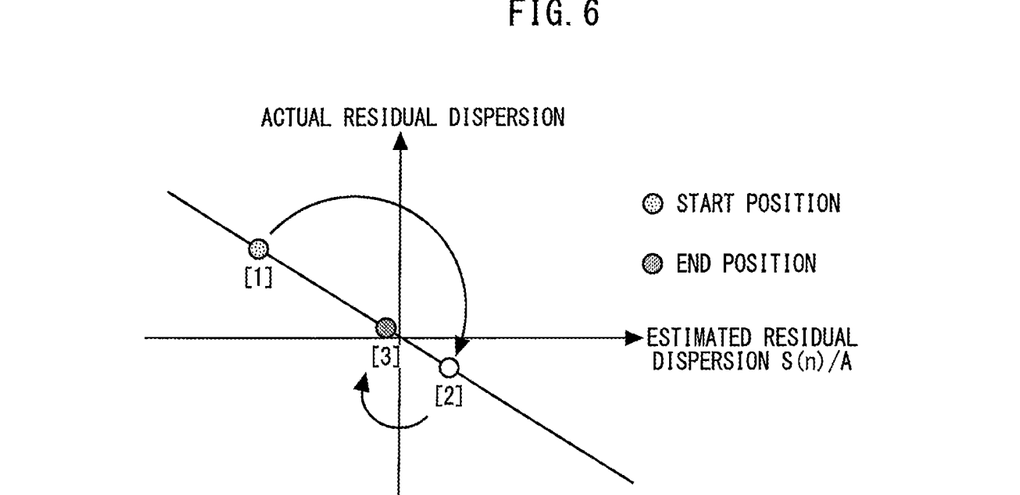
FIG. 6 is a diagram showing the transition of the actual residual dispersion when the chromatic dispersion estimating circuit repeats the estimation of the residual dispersion at plural times.

FIG. 6 is a diagram showing the transition of the actual residual dispersion when the chromatic dispersion estimating circuit repeats the estimation of the residual dispersion at plural times. S(n) means a value proportional to residual dispersion estimated by an n-th trial. A state before the chromatic dispersion estimating circuit 10 starts estimation of the value S proportional to the residual dispersion is indicated by [1] of FIG. 6. As a result of dispersion compensation which the chromatic dispersion estimating circuit 10 performs by using S(1)/A obtained through first residual dispersion estimation processing, the actual residual dispersion is reduced to [2] of FIG. 6. Subsequently, as a result of dispersion compensation which the chromatic dispersion estimating circuit 10 performs by using S(2)/A obtained through second residual dispersion estimation processing, the actual residual dispersion is reduced to [3] of FIG. 6. The estimation repetitive frequency of the chromatic dispersion is not limited, and for example the chromatic dispersion estimating circuit 10 may repeat the Fourier transform step, the eigenvalue sum calculation step and the proportionality factor calculation step at plural times until the residual dispersion (that is, the value S proportional to the residual dispersion) is reduced to be smaller than a predetermined threshold value.

In the foregoing description, the chromatic dispersion compensation is performed with the value obtained by dividing the value S proportional to the estimated residual dispersion by the constant A. However, the present invention is not limited to this embodiment. For example, the value S proportional to the residual dispersion estimated by the chromatic dispersion estimating circuit 10 is divided by a predetermined value k to use a value S/k, and the chromatic dispersion estimating circuit 10 outputs, to the chromatic dispersion compensator 5, plural dispersion values D'(=D0±n(S/k); n represents an integer) which are spaced at intervals of S/k from a chromatic dispersion compensation amount D0 as a center at the calculation time point of the value S proportional to the residual dispersion by the chromatic dispersion estimating circuit 10 while changing n. The chromatic dispersion estimating circuit 10 may determine that the residual dispersion is suppressed with a dispersion value D' at which the residual dispersion becomes smallest. Alternatively, by using a predetermined chromatic dispersion step value ΔD, the chromatic dispersion estimating circuit 10 may output, to the chromatic dispersion compensator 5, plural dispersion values D' (=D0±n*ΔD; n represents an integer) which are spaced at intervals of ΔD from the chromatic dispersion compensation amount D0 as a center at the calculation time point of the value S proportional to the residual dispersion while changing n. The chromatic dispersion estimating circuit 10 may determine that the residual dispersion is suppressed with a dispersion value D' at which the residual dispersion becomes smallest.

Figure 7:
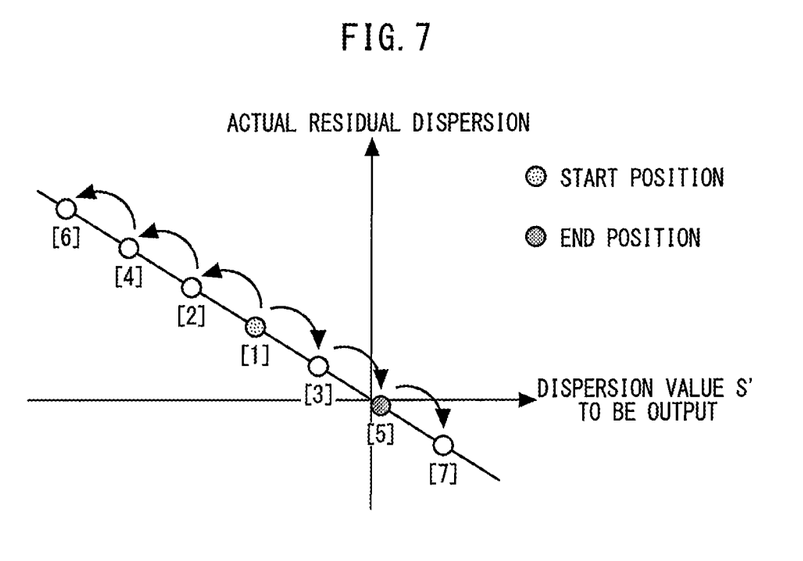
FIG. 7 is a diagram showing another example of the operation of the chromatic dispersion estimating circuit.
Figure 8:
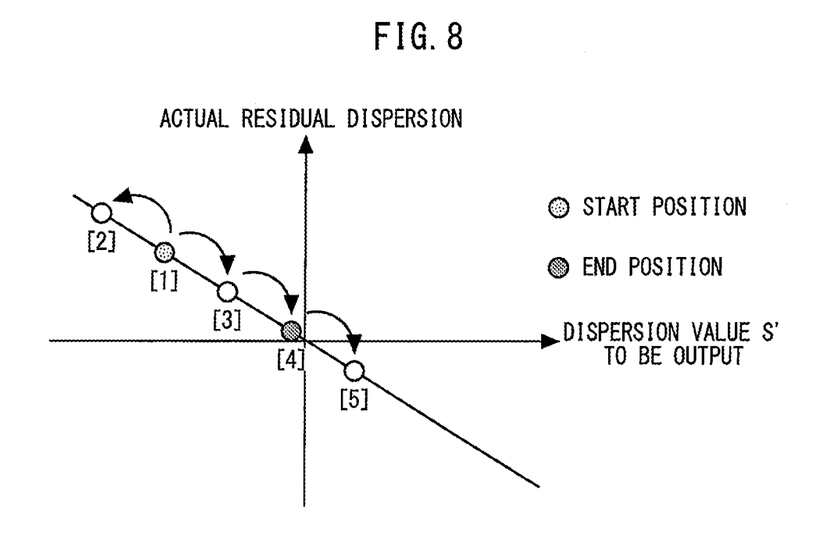
FIG. 8 is a diagram showing another example of the operation of the chromatic dispersion estimating circuit.

FIGS. 7 and 8 are diagrams showing another example of the operation of the chromatic dispersion estimating circuit. As shown in FIG. 7, the chromatic dispersion estimating circuit 10 may take dispersion values ID equally at both the sides with the chromatic dispersion compensation amount D0 as a center at the calculation time point of the value S proportional to the residual dispersion. Alternatively, as shown in FIG. 8, a trial may be performed once at each of an increase side D0+S/k and a decrease side D0−S/k from a chromatic dispersion compensation amount D0 as a center at a first calculation time point, and then the trial may be repeated in such a direction as to reduce the actual residual dispersion while changing the dispersion value D'.

In the embodiments 1 to 5, the chromatic dispersion estimating circuit 10 has been described as one functional block in the digital signal processor 2 as shown in FIG. 3. However, the chromatic dispersion estimating circuit 10 is not limited to this embodiment. For example, the chromatic dispersion estimating circuit 10 may be a logic circuit provided to the outside of the digital signal processor 2. Alternatively, it may be processed by software processing at the outside of the digital signal processor 2.

REFERENCE SIGNS LIST 1 optical receiver; 3 frame processor; 4 analog-to-digital converter; 5 chromatic dispersion compensator; 6 adaptive equalizer; 7 demodulator; 10 chromatic dispersion estimating circuit; 11 Fourier-transformer; 12 eigenvalue calculator; 13 eigenvalue adder; 14 proportionality factor calculator; 15 eigenvalue sum calculator

The invention claimed is:
1. An optical reception device comprising:
a chromatic dispersion compensator performs digital signal processing on a digital signal, which is converted from an optical signal transmitted through an optical fiber, to compensate a chromatic dispersion added to the optical signal in the optical fiber;
an adaptive equalizer adaptively compensating an output signal of the chromatic dispersion compensator for waveform deterioration occurring due to polarization fluctuation of the optical signal transmitted through the optical fiber;
a chromatic dispersion estimating circuit which includes a Fourier-transformer performing Fourier transform on a filter coefficient output from the adaptive equalizer which comprises a finite impulse response filter of N taps (N represents an integer of 2 or more) in a time direction, an eigenvalue sum calculator integrating a frequency-differentiation result of the Fourier-transformed filter coefficient and a complex conjugate of the Fourier-transformed filter coefficient to calculate a matrix, and calculating a sum of two eigenvalues of the matrix, and a proportionality factor calculator calculating a proportionality factor for frequency from the sum of the two eigenvalues and outputting the proportionality factor to the chromatic dispersion compensator,
wherein the proportionality factor is a value proportional to a residual dispersion which is not removed in the chromatic dispersion compensator, and
the chromatic dispersion compensator adds a fixedly present first chromatic dispersion compensation amount with a second chromatic dispersion compensation amount for compensating the residual dispersion to compensate the chromatic dispersion.
2. The optical reception device according to claim 1, wherein the eigenvalue sum calculator includes an eigenvalue calculator calculating the two eigenvalues from the matrix, and an eigenvalue adder adding the two eigenvalues.
3. The optical reception device according to claim 1, wherein the eigenvalue sum calculator calculates a trace that is a sum of diagonal components of the matrix.
4. The optical reception device according to claim 1, wherein zero values are inserted before and after an arrangement of the filter coefficient output from the adaptive equalizer and the Fourier-transformer performs Fourier transform on the filter coefficient in which the zero values are inserted.
5. The optical reception device according to claim 1, wherein the Fourier-transformer performs Fourier transform on the filter coefficient output from the adaptive equalizer, calculates a determinant of each frequency component for the Fourier-transformed filter coefficient, normalizes the Fourier-transformed filter coefficient with the determinant and outputs the normalized filter coefficient.
6. An optical reception device comprising:
an optical receiver converting an optical signal transmitted through an optical fiber to an electrical signal;
an analog-to-digital converter converting the electrical signal output from the optical receiver to a digital signal;
a chromatic dispersion compensator performs digital signal processing on the digital signal to compensate a chromatic dispersion added to the optical signal in the optical fiber;
an adaptive equalizer adaptively compensating an output signal of the chromatic dispersion compensator for waveform deterioration occurring due to polarization fluctuation of the optical signal transmitted through the optical fiber;
a demodulator demodulating an output signal of the adaptive equalizer; and
a chromatic dispersion estimating circuit which includes a Fourier-transformer performing Fourier transform on a filter coefficient output from the adaptive equalizer which comprises a finite impulse response filter of N taps, N representing an integer of two or more, in a time direction, an eigenvalue sum calculator integrating a frequency-differentiation result of the Fourier-transformed filter coefficient and a complex conjugate of the Fourier-transformed filter coefficient to calculate a matrix, and calculating a sum of two eigenvalues of the matrix, and a proportionality factor calculator calculating a proportionality factor for frequency from the sum of the two eigenvalues and outputting the proportionality factor to the chromatic dispersion compensator, wherein the proportionality factor is a value proportional to a residual dispersion which is not removed in the chromatic dispersion compensator, and the chromatic dispersion compensator adds a fixedly preset first chromatic dispersion compensation amount with a second chromatic dispersion compensation amount for compensating the residual dispersion to compensate the chromatic dispersion.

7. An optical reception method comprising:
a chromatic dispersion compensation step of performing digital signal processing on a digital signal, which is converted from an optical signal transmitted through an optical fiber, to compensate a chromatic dispersion added to the optical signal in the optical fiber by a chromatic dispersion compensator;
an adaptive equalization step of adaptively compensating an output signal of the chromatic dispersion compensator for waveform deterioration occurring due to polarization fluctuation of the optical signal transmitted through the optical fiber by an adaptive equalizer;
a Fourier-transform step of performing Fourier transform on a filter coefficient output from the adaptive equalizer which comprises a finite impulse response filter of N taps (N represents an integer of 2 or more) in a time direction;
an eigenvalue s urn calculation step of integrating a frequency-differentiation result of the Fourier-transformed filter coefficient and a complex conjugate of the Fourier-transformed filter coefficient to calculate a matrix, and calculating a sum of two eigenvalues of the matrix; and
a proportionality factor calculation step of calculating a proportionality factor for frequency from the sum of the two eigenvalues and outputting the proportionality factor to the chromatic dispersion compensator,
wherein the proportionality factor is a value proportional to a residual dispersion which is not removed in the chromatic dispersion compensator, and
in the chromatic dispersion compensation step, a fixedly preset first chromatic dispersion compensation amount is added with a second chromatic dispersion compensation amount for compensating the residual dispersion to compensate the chromatic dispersion.

8. The optical reception method according to claim 7, wherein the Fourier transform step, the eigenvalue sum calculation step and the proportionality factor calculation step are repeated at plural times until the proportionality factor is reduced to be smaller than a predetermined threshold value.

* * * * *

UNITED STATES PATENT AND TRADEMARK OFFICE
CERTIFICATE OF CORRECTION

PATENT NO. : 10,422,719 B2
APPLICATION NO. : 15/555321
DATED : September 24, 2019
INVENTOR(S) : Etsushi Yamazaki Page 1 of 1

It is certified that error appears in the above-identified patent and that said Letters Patent is hereby corrected as shown below:

On the Title Page

Item (54) and in the Specification, Column 1, Lines 1-4, Title reads:
CHROMATIC DISPERSION ESTIMATING CIRCUIT, OPTICAL RECEPTION DEVICE AND CHROMATIC DISPERSION AMOUNT ESTIMATING METHOD Should read:
OPTICAL RECEPTION DEVICE AND OPTICAL RECEPTION METHOD Signed and Sealed this
Seventeenth Day of December, 2019

Andrei Iancu
*Director of the United States Patent and Trademark Office*